(12) United States Patent
Lee

(10) Patent No.: US 8,169,521 B2
(45) Date of Patent: May 1, 2012

(54) IMAGE SAMPLING METHOD AND IMAGE PROCESSING METHOD THEREOF

(76) Inventor: Sywe Neng Lee, Taipei (TW)

( * ) Notice: Subject to any disclaimer, the term of this patent is extended or adjusted under 35 U.S.C. 154(b) by 1016 days.

(21) Appl. No.: 12/123,689

(22) Filed: May 20, 2008

(65) Prior Publication Data

US 2009/0290036 A1    Nov. 26, 2009

(51) Int. Cl.
 *H04N 5/335* (2011.01)
 *H04N 9/083* (2006.01)
(52) U.S. Cl. .......................... 348/305; 348/272
(58) Field of Classification Search ............ 348/302, 348/311, 320, 305, 294, 222.1, 281, 283, 348/304, 322, 324, 271, 265, 272
See application file for complete search history.

(56) References Cited

U.S. PATENT DOCUMENTS

| | | | | |
|---|---|---|---|---|
| 6,229,578 B1 * | 5/2001 | Acharya et al. | ............... | 348/607 |
| 6,876,388 B1 * | 4/2005 | Lee et al. | ............... | 348/305 |
| 7,623,729 B2 * | 11/2009 | Ito | ............... | 382/275 |
| 7,834,927 B2 * | 11/2010 | Glenn | ............... | 348/340 |
| 8,120,690 B2 * | 2/2012 | Utagawa | ............... | 348/315 |

* cited by examiner

*Primary Examiner* — David Ometz
*Assistant Examiner* — Ahmed A Berhan
(74) *Attorney, Agent, or Firm* — J.C. Patents

(57) ABSTRACT

An image sampling method for an image sensor is provided herein. The image sensor includes a plurality of pixel elements in the intersections of a plurality of rows and a plurality of columns. During either one of the odd field period or the even field period, the pixel elements in the intersections of the odd rows and the odd columns and the pixel elements in the intersection of the even rows and the even columns are sampled. During the other field period, the pixel elements in the intersections of the even rows and the odd columns and the pixel elements in the intersection of the odd rows and the even columns are sampled. The image processing method utilizes the pixel data in a specific block sampled from the pixel elements during one of the odd and the even field periods to interpolate a specific pixel in the specific block.

17 Claims, 9 Drawing Sheets

FIG. 2 (PRIOR ART)

|    | R1 | R2 | R3 | R4 | R5 | R6 | R7 |
|----|----|----|----|----|----|----|----|
| C7 | B  | B  | R  | R  | B  | B  | R  |
| C6 | G  | G  | G  | G  | G  | G  | G  |
| C5 | R  | R  | B  | B  | R  | R  | B  |
| C4 | G  | G  | G  | G  | G  | G  | G  |
| C3 | B  | B  | R  | R  | B  | B  | R  |
| C2 | G  | G  | G  | G  | G  | G  | G  |
| C1 | R  | R  | B  | B  | R  | R  | B  |

IMAGE SAMPLING METHOD AND IMAGE PROCESSING METHOD THEREOF

BACKGROUND OF THE INVENTION

1. Field of the Invention

The present invention relates to an image sampling method and an image processing method thereof, and more particularly, to a method that samples an image by serrated scanning in alternate rows and interlaced scanning.

2. Description of Related Art

An image sensor is used to translate an optical image focused on the sensor into electrical signals. One very well known type of the image sensor is the charge-coupled device (CCD). An integrated circuit chips containing CCDs are expensive since the specific manufacture process of CCD is required. In addition, the CCD also consumes large power dissipation. Recently, a active-pixel sensor (APS) produced by CMOS process has attracted much attention since it has capability of integrating the circuits, such as control circuit, driving circuit, and signal processing circuit, into a single sensor chip. The advantages of the CMOS APS are low power consumption, process compatibility with on-chip electronics and lower cost as compared with the CCD.

However, the image quality of the CMOS image sensor suffers from noises which will degrade the performance. These noises include thermal noise (i.e. KTC noise), 1/f noise and fixed pattern noise. The thermal noise is associated with the sampling of the image data, the 1/f noise is associated with the circuit which is used to amplify the image signal and the fixed pattern noise is associated with non-uniformity between columns within a pixel array. These noises become major factors causing the CMOS APS to have lower sensitivity or lower dynamic range of sampling as compared with the CCD. One of the ways to improve the sensitivity or dynamic range is to increase the exposure time as much as possible with a fixed frame rates.

FIG. 1 is a diagram of an image sensor. Referring to FIG. 1, the image sensor 100 includes a plurality of pixel element 110 arranged in rows and columns. The pixel element 110 includes a photodiode Pd and the transistors T1 through T3. It is assumed that the interlaced scanning system conforms to the standard specified by the national television standards committee (NTSC) so that an image is divided into an odd field and an even field to display; and the frame rate of the interlaced scanning system is 1/60 seconds per field. For convenience of description, the coordinates of the pixel element 110 is signed as (X, Y) and the pixel element 110 in (X1, Y1) is taken as an example. Referring to FIG. 1, the node N1 of the photodiode Pd is initially reset to a reference voltage Vref in the control of the transistor T1, which is turned on when the row line RST1 is active. After sufficient exposure time, the control line RD1 is active to turn on the transistor T3 so that the photodiode voltage at node N1 translated through the source follower transistor T2 can be read out via the column line RT1. Then, the photodiode voltage will be sampled and held in a following correlated doubled sampling (CDS) circuit (not illustrated). In accordance with the said principle, the photodiodes in each row are exposed to generate the voltage signal to the corresponding column lines in response to the state of the row line as well as the state of the corresponding control line.

With regard to the image sensor 100, a typical Bayer pattern color filter arrangement is deployed on the pixel elements 110 so that each pixel element 110 only senses one of either red or green or blue image information. In order to display a full color image of each pixel, an arithmetic calculation called color interpolation need to be employed on a pixel matrix. FIG. 2 is a diagram of a pixel array sampled from the image sensor 100 in FIG. 1. Referring to FIG. 2, taking the 3×3 pixel matrix 210a as an example, three consecutive row data is needed to implement color interpolation. For convenience of description, the image data of pixel in (X, Y) is signed as red data (R), green data (G) or blue data (B), wherein image data is obtained by sampling the image information. As the pixel matrix 210a shown, the pixel data in the intersections of three rows X1 through X3 and three columns Y1 through Y3 are utilized to interpolate the pixel in (X2, Y2). For example, the red data of the pixel in (X2, Y2) is an average of the red data of the pixels in (X1, Y2) and (X3, Y2). The green data of the pixel in (X2, Y2) is an average of the green data of the pixels in (X1, Y1), (X1, Y3), (X2, Y2), (X3, Y1) and (X3, Y3). The blue data of the pixel in (X2, Y2) is an average of blue data of the pixels in (X2, Y1) and (X2, Y3).

Referring to FIG. 1 and FIG. 2, by raster scanning and interlaced scanning, the pixel elements 110 are scanned and sampled in an order of rows X1, X3, X5, . . . X511 during an odd field period and the corresponding image data can be obtained to display the odd field. Next, the pixel elements 110 are scanned and sampled in an order of rows X2, X4, X6, . . . X512 during an even field period and the corresponding image data can be obtained to display the even field. Only odd rows are scanned during the odd field period; while only even rows are scanned during the even field period. It is obviously that an additional frame buffer occupying a significant cost is needed to store the odd field data or the even field data to implement color interpolation and further, the color interpolation can not be performed in real time since it needs at least three consecutive row data.

Referring to FIG. 1, as for the interlaced scanning system, the maximum exposure time of the pixel element 110 is 1/30 seconds since the photodiodes Pd in each odd row can be exposed from the beginning of the odd field period to the beginning of the next odd field period. If a progressive scanning is employed in the interlaced scanning system, the pixel elements 110 are sampled in an order of X1, X2, X3, . . . X512 during both of the odd field period and the even field period. As a result, not only it needs at least three line buffers to store pixel data for color interpolation, but also the exposure time of each pixel element is reduced by a half and thus the signal to noise ratio of the image is degraded under dark environment. How to enhance the image quality of the pixel element by maintain the maximum exposure time and eliminate an additional cost of the frame buffer for the interlaced scanning system becomes an important issue for CMOS sensor chip designer to improve.

SUMMARY OF THE INVENTION

Accordingly, the present invention provides an image sampling method for an image sensor that samples the pixel elements by serrated scanning in alternate rows and interlaced scanning. This sampling method adapts to an interlaced scanning system and benefits the following real time color interpolation without addition cost of frame buffer.

An image sampling method for an image sensor is provided in the present invention. The image sensor includes a plurality of pixel elements in the intersections of a plurality of rows and a plurality of columns. The pixel elements in the intersections of the odd rows and the odd columns and the pixel elements in the intersections of the even rows and the even columns are sampled during either one of an odd field period or an even field period. The pixel elements in the intersection of the even rows and the odd columns and the pixel elements in the intersection of the odd rows and the even columns during the other of the odd field period and the even field period.

An image processing method for color interpolation is provided in the present invention. First, an image sensor having a plurality of pixel elements in the intersections of a plurality of rows and a plurality of columns is provided and each pixel element senses one of red, green and blue image information. Next, the pixel elements in the intersections of the odd rows and the odd columns and the pixel elements in the intersection of the even rows and the even columns are sampled during either one of an odd field period or an even field period. Besides, the pixel elements in the intersections of the even rows and the odd columns and the pixel elements in the intersection of the odd rows and the even columns during the other of the odd field period and the even field period. Next, a plurality of pixel data in a specific block sampled from the pixel elements during one of the odd field period and the even field period are utilized to interpolation a specific pixel in the specific block.

The present invention provides the image sampling method adapted to the interlaced scanning system to sample the image sensor. In the interlaced scanning system, an image sensed by the image sensor can be divided into the odd field and the even field. The odd field contains the pixel data sensed from the pixel elements in the intersections of the odd rows and the odd columns and the pixel elements in the intersections of the even rows and the even columns. The even field contains the pixel data sensed from the pixel elements in the intersections of the even rows and the odd columns and the pixel elements in the intersections of the odd rows and the even columns. Since each pixel element senses image information with one of the primary of colors of light, the present invention provides the image processing method that can employ color interpolation on the said pixel data in odd field or in even field to interpolate a full color image at relative less memory buffer.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 2:
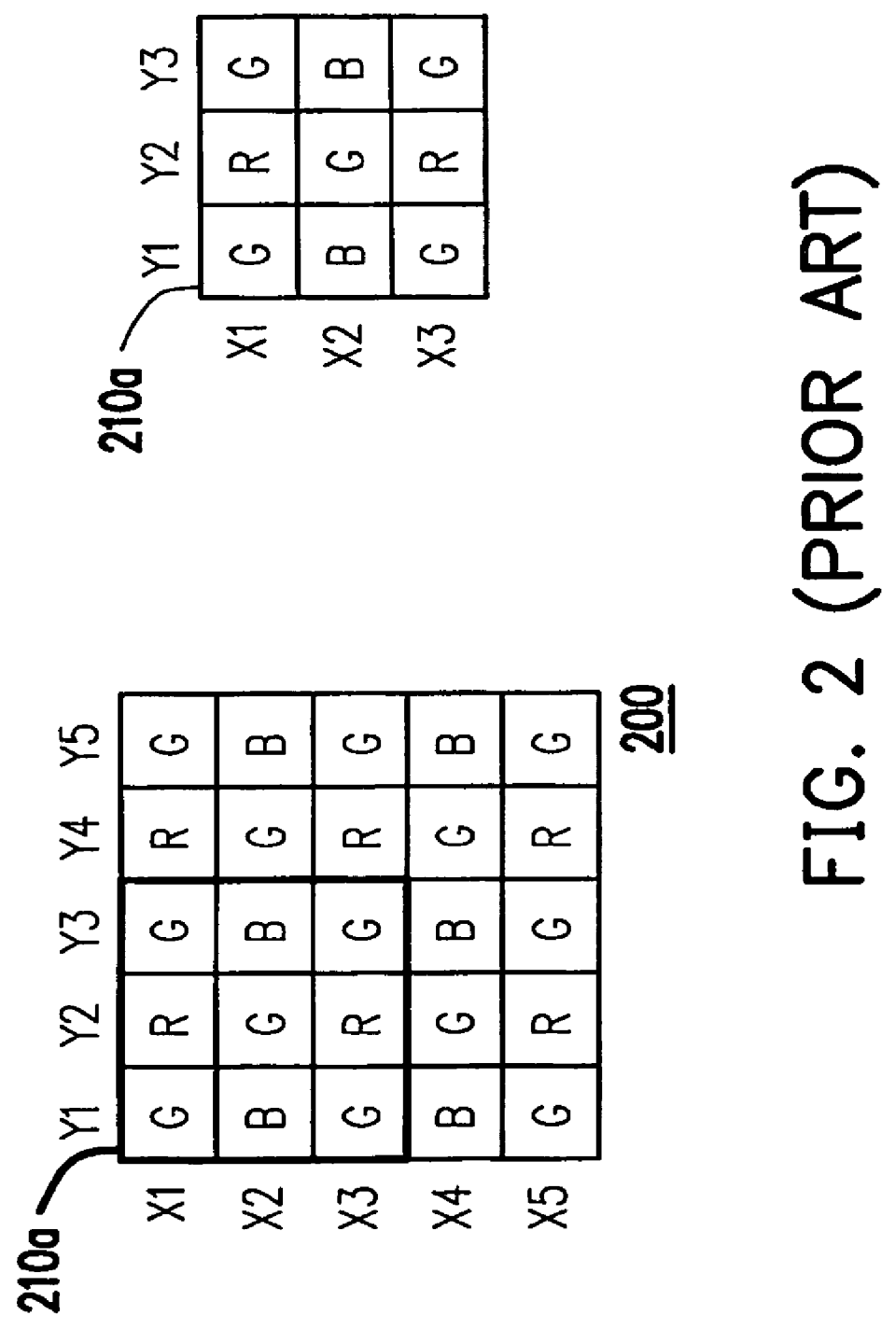

FIG. 2 is a diagram of a pixel array sampled from the color image sensor.

FIG. 4A is a diagram of a pixel array sensed by the image sensor in FIG. 3.

FIG. 4B is a diagram of the pixel array corresponding to the odd field according to the embodiment in FIG. 3.

FIG. 4C is a diagram of the pixel array corresponding to the even field according to the embodiment in FIG. 3.

DESCRIPTION OF EMBODIMENTS

Figure 3:
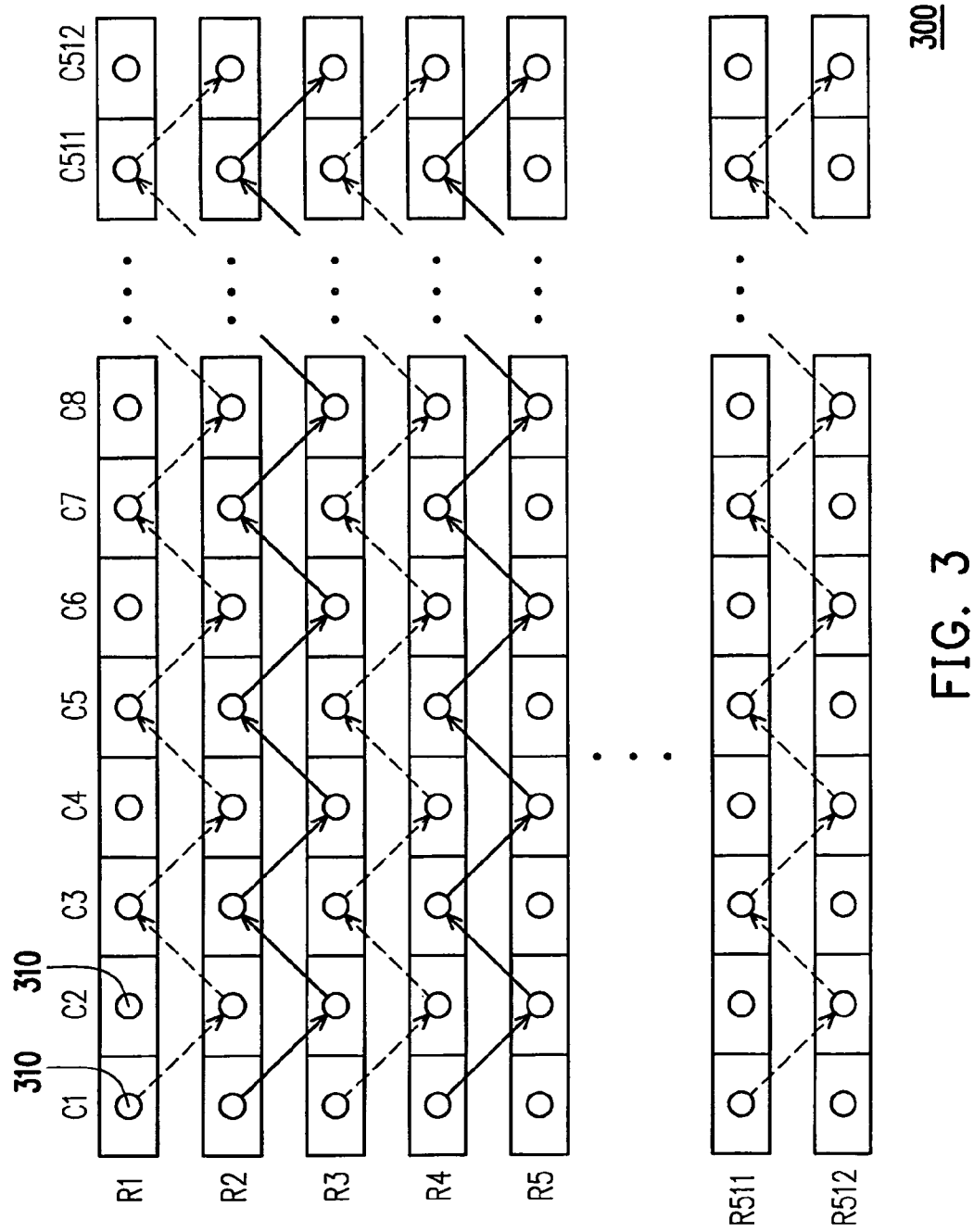
FIG. 3 is a diagram of an image sensor according to an embodiment of the present invention.

FIG. 3 is a diagram of an image sensor according to an embodiment of the present invention. Referring to FIG. 3, the image sensor 300 includes a plurality of pixel elements 310 in the intersections of m rows and n columns. It is assumed that there are 512 rows R1 through R512 and 521 columns C1 through C512 in the embodiment, i.e. m=512 and n=512, and the image sensor 300 is implemented by CMOS active-pixel sensor (APS). In the disclosure, R1, R3, R5, . . . R511 refer to odd rows and R2, R4, R6, . . . R512 refer to even rows; and C1, C3, C5, . . . C511 refer to odd columns and C2, C4, C6, . . . C512 refer to even columns. The pixel elements 310 of image sensor 300 are used to translate an optical image focused on them into electrical signals. In order to display an image, the image information sensed by pixel elements 310 need to be sampled to the corresponding pixel data and then the post-processing can be employed on the pixel data. The image sampling method of the embodiment is adapted to an interlaced scanning system, that is, an image is divided into an odd field and an even field to display.

Referring to FIG. 3, as the dotted line with an arrow shown, the pixel elements 310 in the intersection of the odd rows R1, R3, R5, . . . R511 and the odd columns C1, C3, C5, . . . C511 and the pixel elements 310 in the intersection of the even rows R2, R4, R6, . . . R512 and the even columns C2, C4, C6 . . . C512 are sampled during an odd field period. The pixel elements 310 are sampled by serrated scanning in alternate rows in the embodiment. For convenience of description, each pixel element 310 in the intersection of the $i^{th}$ row and the $j^{th}$ column is denoted as (i, j). The pixel element 310 in (2x−1, 2y−1) and the pixel element 310 in (2x, 2y) are sequentially sampled during the odd field period, wherein x is an integer between 1~(m/2) and y is an integer between 1~(n/2) relative to each x variable. For example, in order to compose of the $1^{st}$ line of the odd field (i.e. x=1), the pixel elements 310 in (R1, C1), (R2, C2), (R1, C3), (R2, C4), . . . (R1, C511), and (R2, C512) are sampled. In order to compose of the $2^{nd}$ line of the odd field (i.e. x=2), the pixel elements 310 in (R3, C1), (R4, C2), (R3, C3), (R4, C4), . . . (R3, C511), and (R4, C512) are sampled and so on to compose of the $x^{th}$ line of the odd field.

Besides, as the solid line with an arrow shown, the pixel elements 310 in the intersection of the even rows R2, R4, R6, . . . R512 and the odd columns C1, C3, C5, . . . C511 and the pixel elements 310 in the intersection of the odd rows R3, R5, . . . R511 and the even columns C2, C4, C6 . . . C512 are sampled during an even field period. In the embodiment, the pixel element 310 in (2x, 2y−1) and the pixel element 310 in (2x+1, 2y) are sampled during the even field period. For example, in order to compose of the $1^{st}$ line of the even field (i.e. x=1), the pixel elements 310 in (R2, C1), (R3, C2), (R2, C3), (R3, C4), . . . (R2, C511) and (R3, C512) are sampled. In order to compose of the $2^{nd}$ line of the even field (i.e. x=2), the pixel elements 310 in (R4, C1), (R5, C2), (R4, C3), (R5, C4), . . . (R4, C511) and (R5, C512) are sampled and so on to compose of the $x^{th}$ line of the odd field.

In the embodiment, the image sensor 300 conforms to a Bayer pattern, that is, each pixel element 310 only senses image information with one of a plurality of primary colors of light, such as red (R), green (G) and blue (B) and the ratio of red (R), green (G) and blue (B) in the Bayer pattern are 1:2:1. Hence, each pixel element 310 may include a color filter disposed on. FIG. 4A is a diagram of a pixel array sensed by the image sensor 300 in FIG. 3. Referring to FIG. 3 and FIG. 4A, by proper color filter arrangement, the pixel elements 310 in one of the columns, e.g. the column C2, sense green image information (G), and every two neighboring pixel elements 310 in one column neighboring to the column C2, e.g. column C1, alternatively sense red image information with (R) and blue image information (B). Besides, every two neighboring pixel elements 310 in the other column neighboring to the column C2, e.g. column C3, alternatively sense blue image information (B) and red image information with (R). Hence, each pixel data with one of red (R), green (G) and blue (B) in the pixel array 400 is obtained by sampling the corresponding pixel element 310. Generally speaking, an image formed by such pixel array 400 is often called a raw image so that color interpolation should be employed on such raw image for displaying a full color image.

Figure 4B:
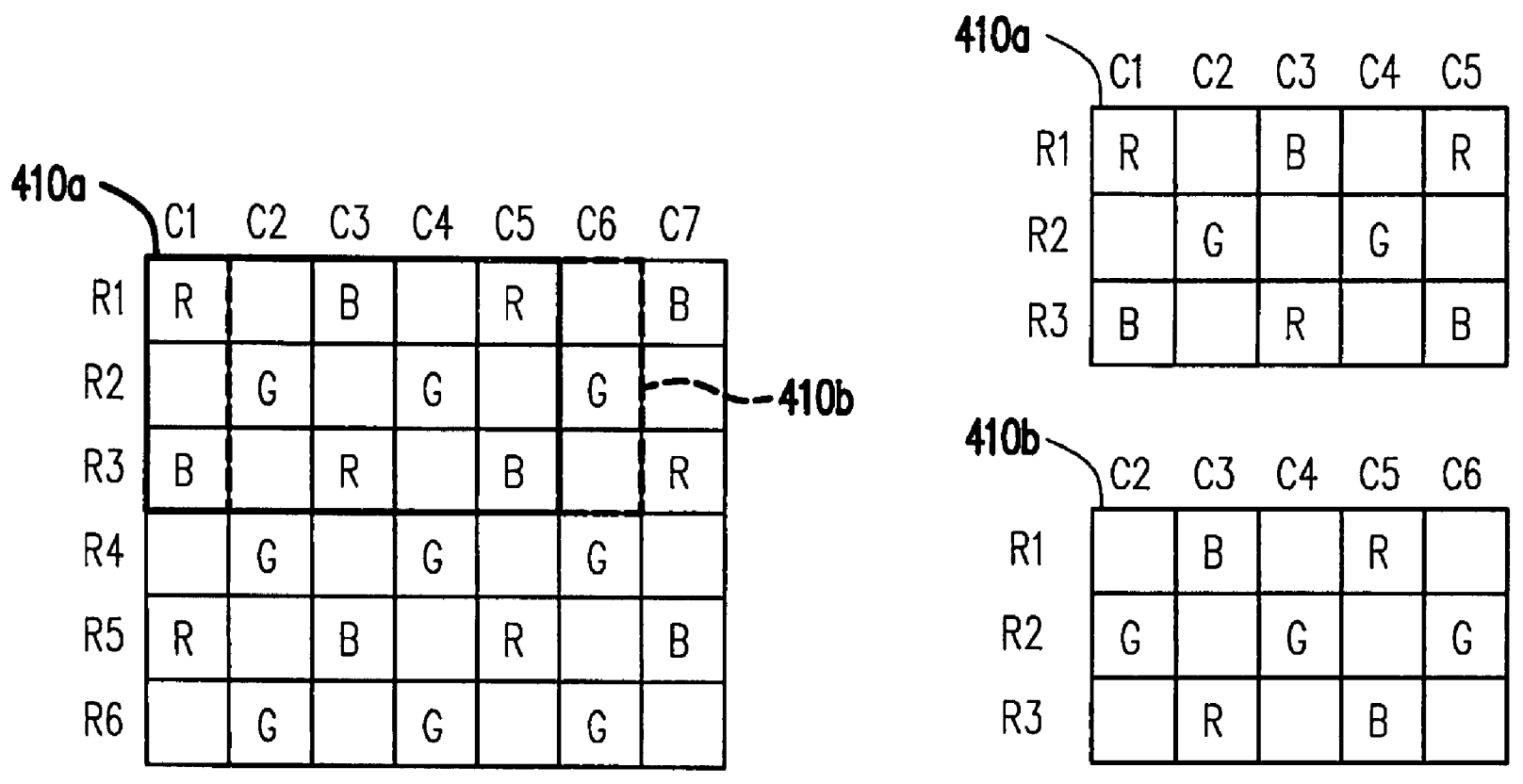

As the foregoing description, the image sensor 300 is sampled by serrated scanning in the alternate rows and interlaced scanning. The following embodiment provides an image processing method for color interpolation. FIG. 4B is a diagram of the pixel array corresponding to the odd field according to the embodiment in FIG. 3. Referring to FIG. 4B, the pixel data corresponding to the odd field are obtained by sampling the pixel elements 310 during the odd field period. It is assumed that a specific block, e.g. 3×5 block is utilized to mask the pixel data necessary for color interpolation. First, the color interpolation is employed on the pixel data in the 3×5 block 410a, when the $2^{nd}$ line of the odd field is obtained. According to the said scanning order during the odd field period, the 3×5 block 410a includes the pixels in (R1, C1), (R2, C2), (R1, C3), (R2, C4), (R1, C5), (R3, C1), (R3, C3) and (R3, C5) and those pixel data are utilized to interpolate a specific pixel, e.g. the pixel in (R2, C3) which is the central pixel in the 3×5 block 410a. For example, an interpolated red data of the pixel in (R2, C3) is an average of the pixel data with red in the 3×5 block 410a, an interpolated green data of the pixel in (R2, C3) is an average of the pixel data with green in the 3×5 block 410a, and an interpolated blue data of the pixel in (R2, C3) is an average of the pixel data with blue in the 3×5 block 410a. Hence, the pixel in (R2, C3) contains the full color.

Next, the 3×5 block 410a is right shifted by one column and the color interpolation is employed on the pixel data in the 3×5 block 410b. According to the said scanning order during odd field period, the 3×5 block 410b includes the pixels in (R2, C2), (R1, C3), (R2, C4), (R1, C5), (R2, C6), (R3, C3), and (R3, C5) and those pixel data are utilized to interpolate the pixel in (R2, C4) which is the central pixel in the 3×5 block 410b. The interpolated red data of the pixel in (R2, C4) is an average of the pixel data with red in the 3×5 block 410b and the interpolated blue data of the pixel in (R2, C4) is an average of the pixel data with blue in the 3×5 block 410b. The interpolated green data of the pixel in (R2, C4) can be the intrinsic pixel data with green of the pixel in (R2, C4) or an average of the pixel data with green in the 3×5 block 410b. Hence, the pixel in (R2, C4) contains the full color. It is noted that two line buffers or one line buffer plus a few buffer registers will be enough to store pixel data for color interpolation and the color interpolation can be almost real time employed.

Figure 4C:
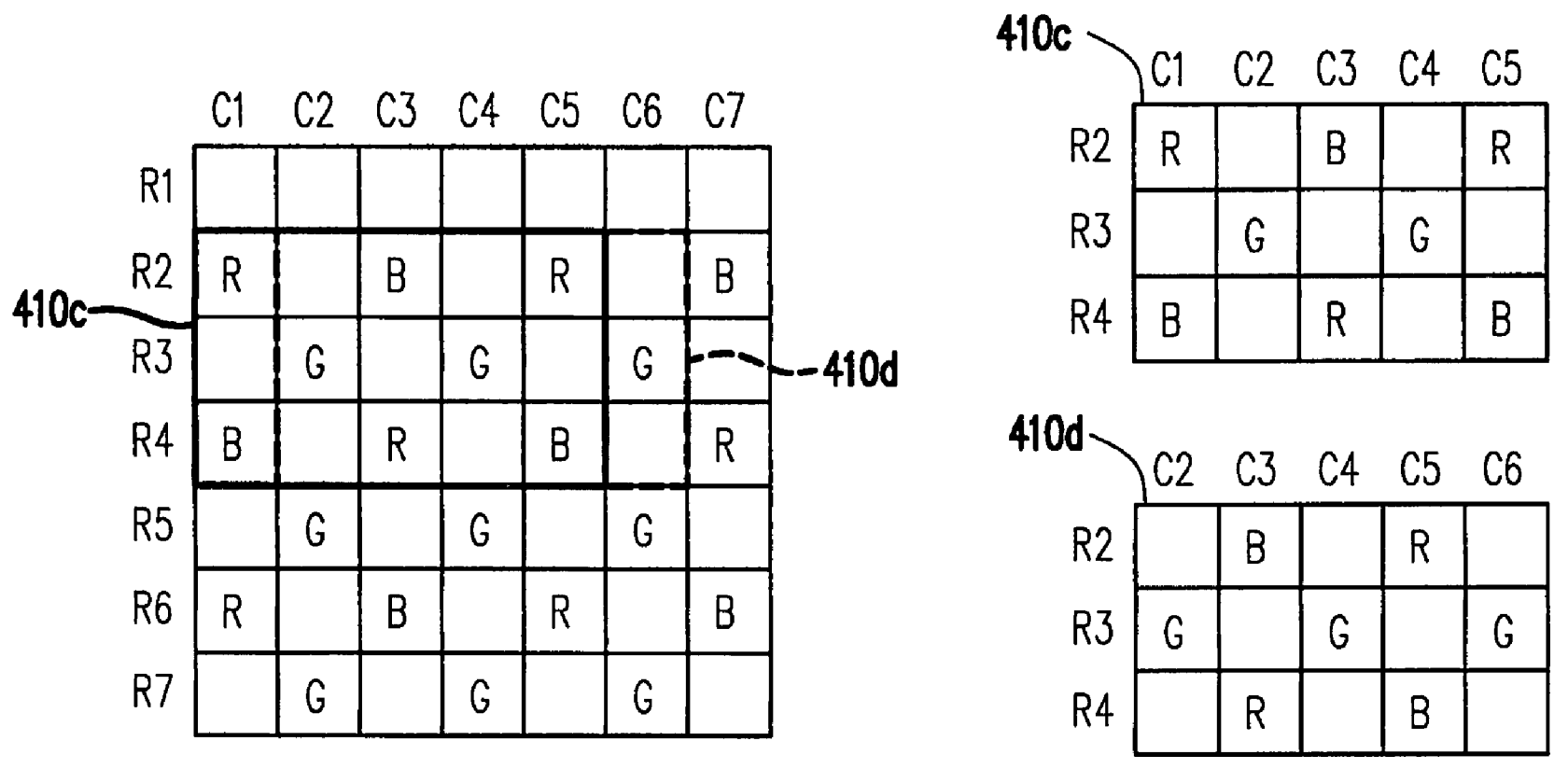

FIG. 4C is a diagram of the pixel array corresponding to the even field according to the embodiment in FIG. 3. Referring to FIG. 4C, the pixel data in the pixel array corresponding to the even field are obtained by sampling the pixel elements 310 during the even field period. When the $2^{nd}$ line of the even field is obtained, the color interpolation is employed on the pixel data in the 3×5 block 410c. According to the said scanning order during the even field period, the 3×5 block 410c includes the pixels in (R2, C1), (R3, C2), (R2, C3), (R3, C4), (R2, C5), (R4, C1), (R4, C3) and (R4, C5) and those pixel data are utilized to interpolate the pixel in (R3, C3). After employing the color interpolation on 3×5 block 410c, the 3×5 block 410c is right shifted by one column so as to obtain the 3×5 block 410d. The 3×5 block 410d includes the pixels in (R3, C2), (R2, C3), (R3, C4), (R2, C5), (R3, C6), (R4, C3) and (R4, C5) and those pixel data are utilized to interpolate the pixel in (R3, C4). The color interpolation is the same with the embodiment in FIG. 4B and the detail is not reiterated.

Figure 5:
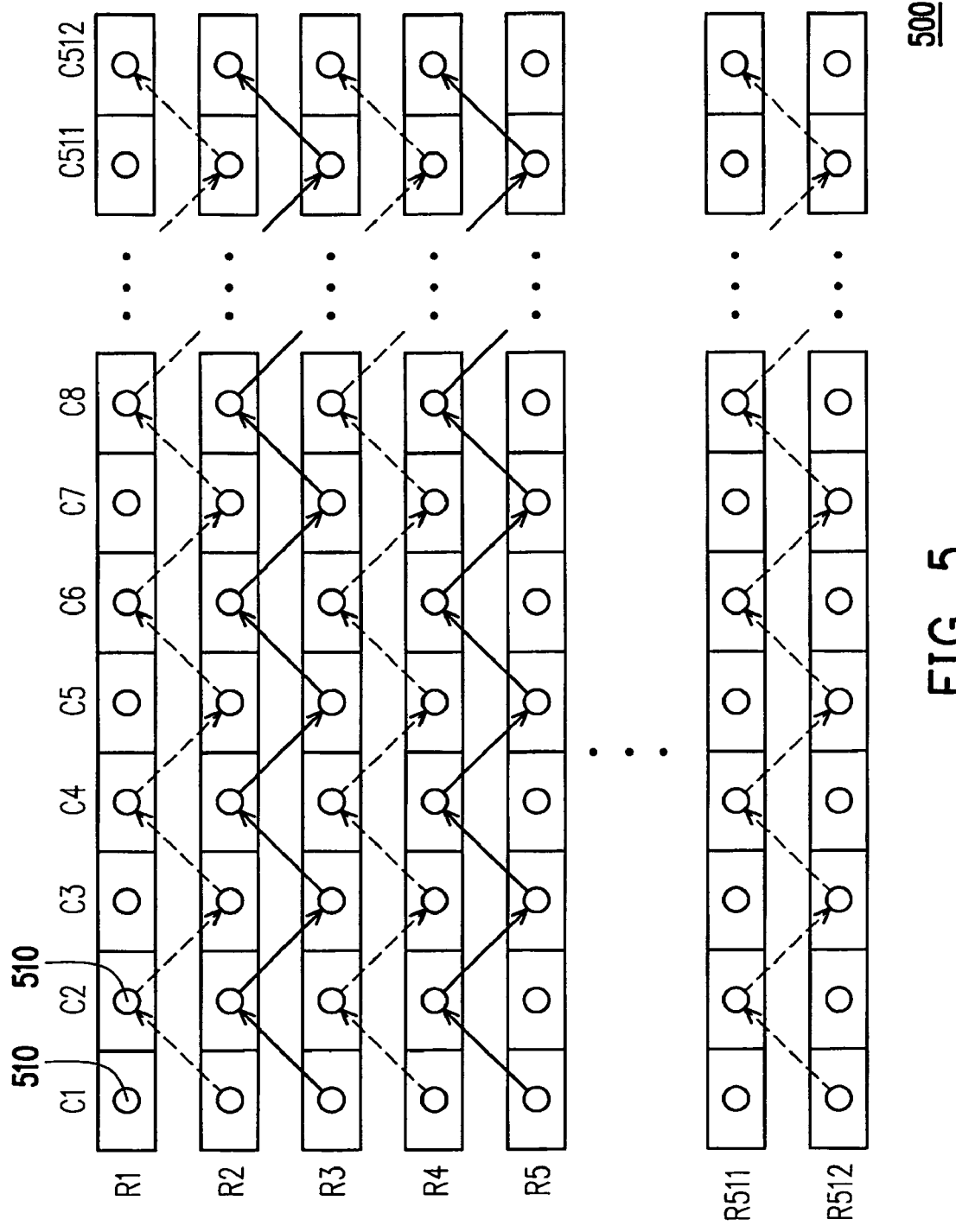
FIG. 5 is a flow chart of the image sampling method according to an embodiment of the present invention.

In order to make people ordinary skilled in the art easy to practice the present invention, there is another embodiment of image sampling method. FIG. 5 is a diagram of an image sensor according to another embodiment of the present invention. Referring to FIG. 5, the image sensor 500 includes a plurality of pixel elements 510 in the intersections of m rows and n columns, e.g. m=512 and n=512. As the dotted line with an arrow shown in FIG. 5, the pixel elements 510 in the intersection of the even rows R2, R4, R6, ... R512 and the odd columns C1, C3, C5, ... C511 and the pixel elements 510 in the intersection of the odd rows R1, R3, R5, ... R511 and the even columns C2, C4, C6, ... C512 are sampled during an odd field period. Each pixel element 510 in the intersection of the $i^{th}$ row and the $j^{th}$ column is denoted as (i, j). The pixel elements 510 in (2x, 2y−1) and the pixel element 510 in (2x−1, 2y) are sequentially sampled during the odd field period, wherein x is an integer between 1~(m/2) and y is an integer between 1~(n/2) relative to each x variable. For example, in order to composed of the $1^{st}$ line of the odd field (i.e. x=1), the pixel elements 510 in (R2, C1), (R1, C2), (R2, C3), (R1, C4), ... (R2, 511), and (R1, 512) are sampled. In order to compose of $2^{nd}$ line of the odd field (i.e. x=2), the pixel elements 510 in (R4, C1), (R3, C2), (R4, C3), (R3, C4), ... (R4, C511) and (R3, C512) are sampled and so on to compose of the $x^{th}$ line of the odd field.

Besides, as the solid line with an arrow shown in FIG. 5, the pixel elements 510 in the intersection of the odd rows R3, R5, R7, ... R511 and the odd columns C1, C3, C5, ... C511, and the pixel elements 510 in the intersection of the even rows R2, R4, R6, ... R512 and the even columns C2, C4, C6, ... C512 are sampled during an even field period. In the embodiment, the pixel element 510 in (2x+1, 2y−1) and the pixel element 510 (2x, 2y) are sampled in the even field period. For example, in order to compose of the $1^{st}$ line of the even field (i.e. x=1), the pixel elements 510 in (R3, C1), (R2, C2), (R3, C3), (R2, C4), ... (R3, 511) and (R4, 512) are sampled. In order to compose of the $2^{nd}$ line of the even field (i.e. x=2), the pixel elements 510 in (R5, C1), (R4, C2), (R5, C3), (R4, C4), ... (R5, C511) and (R4, C512) are sampled and so on to composed of the $x^{th}$ line of the odd field.

Figure 6:
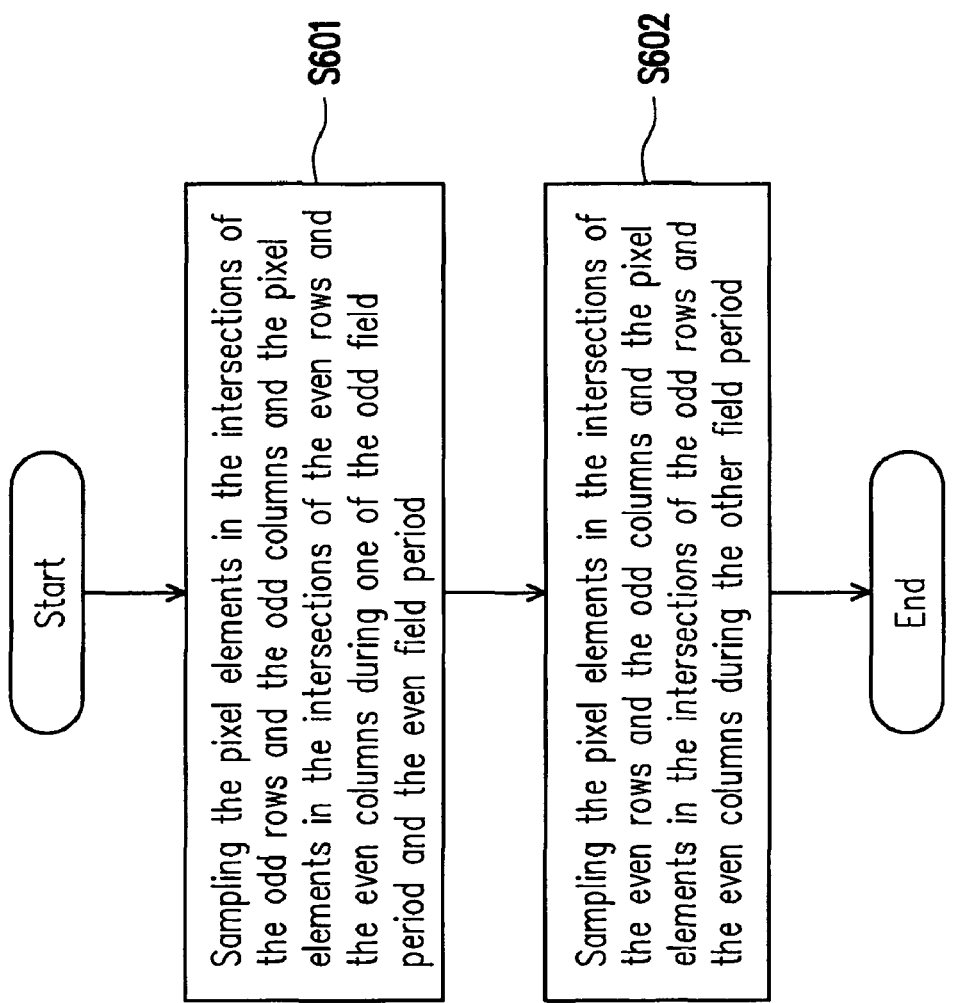
FIG. 6 is a flow chart of the image processing for color interpolation according to an embodiment of the present invention.

According to the embodiments described above, the steps of the following method could be generalized. FIG. 6 is a flow chart of the image sampling method according to an embodiment of the present invention. Referring FIG. 6, in step S601, the pixel elements in the intersections of the odd rows and the odd columns and the pixel elements in the intersections of the even rows and the even columns are sampled during either one of the odd field period or the even field period. In step S602, the pixel elements in the intersection of the even rows and the odd columns and pixel elements in the intersection of the odd rows and the even columns are sampled during the other of the odd field period and the even field period. It is noted that the display order of the odd field and the even field is determined by the interlaced scanning system. The said embodiment takes the odd field earlier than the even field as the examples, but the invention should not be limited in the order of the said steps.

Figure 7:
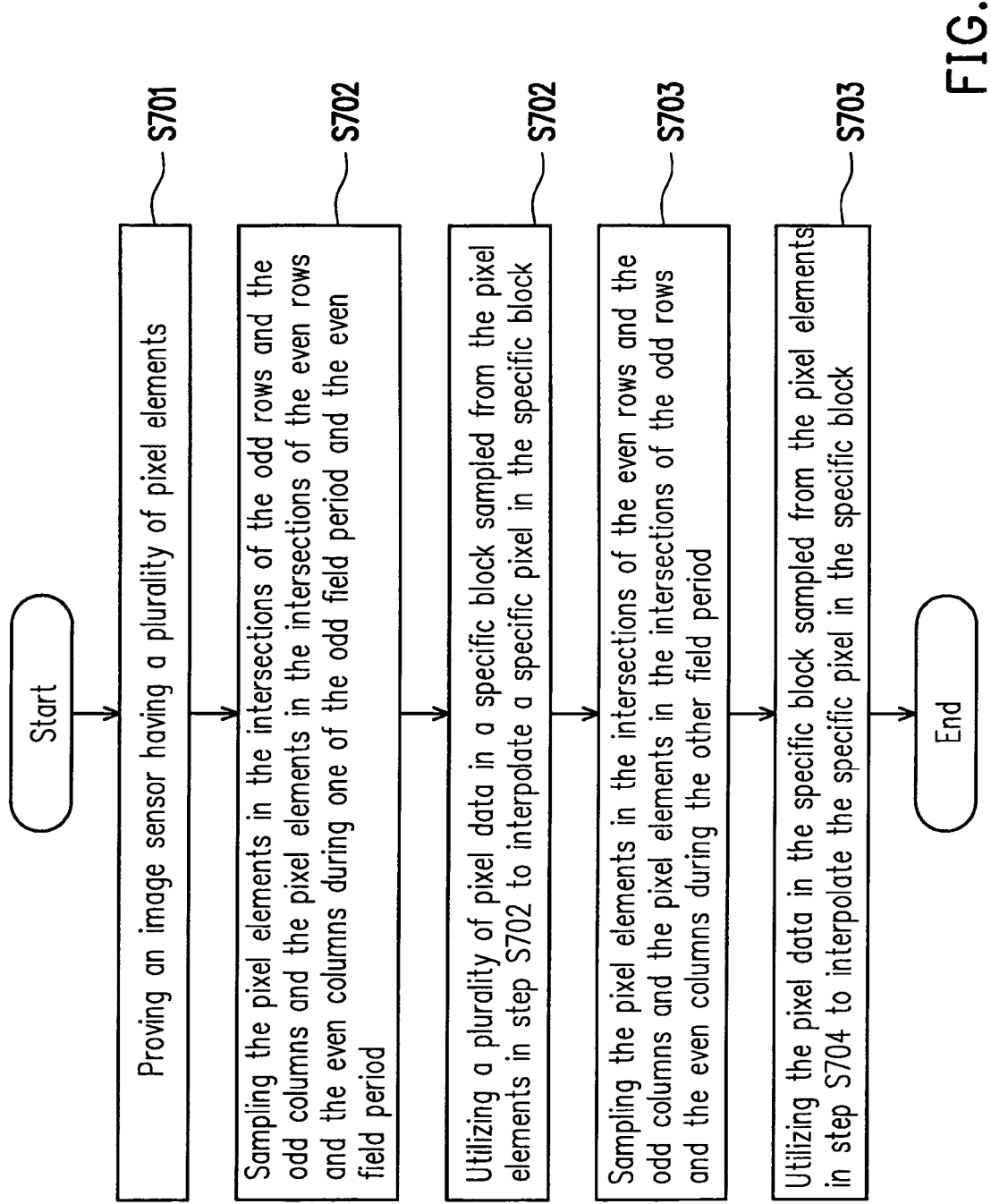
FIG. 7 is a flow chart of the image processing for color interpolation according to an embodiment of the present invention.

FIG. 7 is a flow chart of the image processing method according to an embodiment of the present invention. Referring to FIG. 7, first, an image sensor is provided in step S701, wherein the image sensor has a plurality of pixel elements in the intersection of a plurality of rows and a plurality of columns. Each pixel element senses image information with one of a plurality of primary colors of light, such as red, green and blue. In step S702, the pixel elements in the intersections of the odd rows and the odd columns and the pixel elements in the intersections of the even rows and the even columns are sampled during either one of the odd field period or the even field period. In step S703, a plurality of pixel data in a specific block, which are sampled from the pixel elements in step S702, are utilized to interpolate a specific pixel in the specific block. In step S704, the pixel elements in the intersection of the even rows and the odd columns and the pixel elements in the intersection of the odd rows and the even columns are sampled during the other of the odd field period and the even field period. In step S705, the pixel data in the specific block, which are sampled from the pixel elements in step S704, are utilized to interpolate the specific pixel in the specific block.

Figure 1:
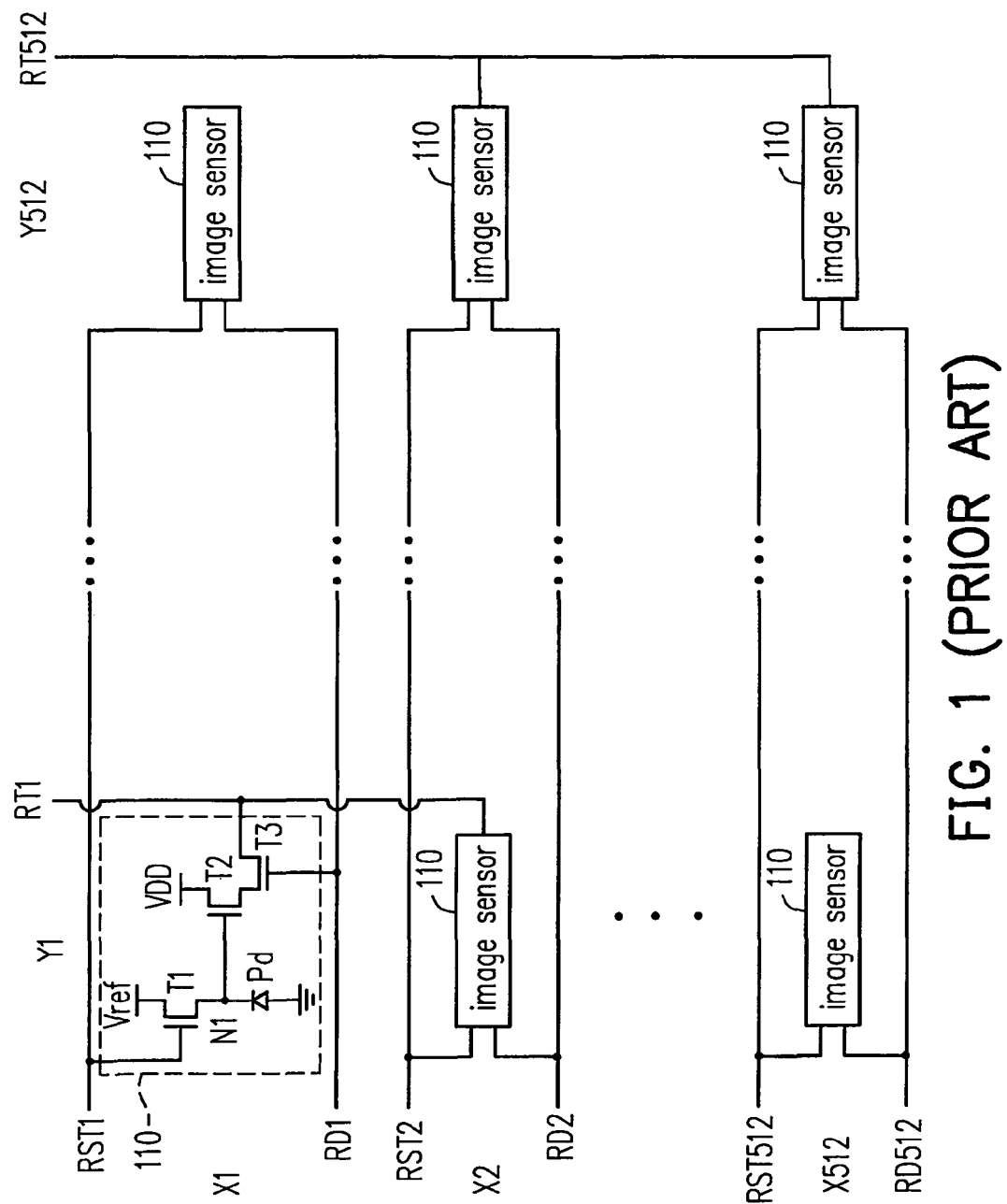
FIG. 1 is a diagram of an image sensor.

In summary, the said embodiment provides an image sampling method adapting to the interlaced scanning system to sample the image sensor by serrated scanning in the alternate rows during the odd field period and the even field period. In addition, in order to display a full color image, the pixel data sampled from the pixel elements of the image sensor during the odd field period (or the even field period) and masked by the specific block are utilized to interpolate the specific pixel in the specific block. It is assumed that the interlaced system in the said embodiments conforms to the standard specified by National Television Standards Committee (NTSC) or the Phase Alternating Line (PAL) system so that the odd field period and the even field period are $1/60$ seconds for NTSC and $1/50$ seconds for PAL. Hence, the maximum exposure time of the image sensor can reach to $1/30$ seconds for NTSC and $1/25$ for PAL, i.e. the time from the beginning of the odd field period to the beginning of the next odd field period. Besides, since the pixel data in three consecutive rows are utilized to perform color interpolation, two line buffers or one line buffer plus a few buffer registers will be enough for color interpolation as compared with the prior art in FIG. 1 in which a big size frame buffer is needed to store odd field data or even field data for color interpolation.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. An image sampling method for an image sensor, wherein the image sensor includes a plurality of pixel elements in the intersections of a plurality of rows and a plurality of columns, comprising:
    (a) only sampling the pixel elements in the intersections of the odd rows and the odd columns and the pixel elements in the intersections of the even rows and the even columns during either one of an odd field period or an even field period; and
    (b) only sampling the pixel elements in the intersections of the even rows and the odd columns and the pixel elements in the intersections of the odd rows and the even columns during the other of the odd field period and the even field period, which is a complementary field period of the step (a).

2. The image sampling method as claimed in claim 1, wherein each pixel element in the intersection of the ith row and the jth column is denoted as (i, j) and the step (a) further comprises:
    sequentially sampling the pixel element in $(2x-1, 2y-1)$ and the pixel element in $(2x, 2y)$ during the odd field period, wherein the x variable is sequentially increased by one from one to an integer of $(m/2)$, and the y variable is sequentially increased by one from one to an integer of $(n/2)$ relative to each x variable, m presents the number of rows and n presents the number of columns.

3. The image sampling method as claimed in claim 1, wherein each pixel element in the intersection of the ith row and the jth column is denoted as (i, j) and the step (a) further comprises:
    sequentially sampling the pixel element in $(2x+1, 2y-1)$ and the pixel element in $(2x, 2y)$ during the even field period, wherein the x variable is sequentially increased by one from one to an integer of $(m/2)$, and the y variable is sequentially increased by one from one to an integer of $(n/2)$ relative to each x variable, m presents the number of rows and n presents the number of columns.

4. The image sampling method as claimed in claim 1, wherein each pixel element in the intersection of the ith row and the jth column is denoted as (i, j) and the step (b) further comprises:
    sequentially sampling the pixel element in $(2x, 2y-1)$ and the pixel element in $(2x+1, 2y)$ during the even field period, wherein the x variable is sequentially increased by one from one to an integer of $(m/2)$, and the y variable is sequentially increased by one from one to an integer of $(n/2)$ relative to each x variable, m presents the number of rows and n presents the number of columns.

5. The image sampling method as claimed in claim 1, wherein each pixel element in the intersection of the ith row and the jth column is denoted as (i, j) and the step (b) further comprises:
    sequentially sampling the pixel element in $(2x, 2y-1)$ and the pixel element in $(2x-1, 2y)$ during the odd field period, wherein the x variable is sequentially increased by one from one to an integer of $(m/2)$, and the y variable is sequentially increased by one from one to an integer of $(n/2)$ relative to each x variable, m presents the number of rows and n presents the number of columns.

6. The image sampling method as claimed in claim 1, wherein the image sensor conforms to a Bayer pattern and each pixel element senses the image information with one of red, green and blue.

7. The image sampling method as claimed in claim 6, wherein the pixel element in one of the columns sense green image information, every two neighboring pixel elements in one column neighboring to the one of the columns alternatively sense red image information and blue image information and every two neighboring pixel elements in the other column neighboring to the one of the columns alternatively sense blue image information and red image information.

8. An image processing method for color interpolation, comprising:
    (a) providing an image sensor having a plurality of pixel elements in the intersections of a plurality of rows and a plurality of columns, wherein each pixel element senses image information with one of a plurality of primary colors of light;
    (b) only sampling the pixel elements in the intersections of the odd rows and the odd columns and the pixel elements in the intersection of the even rows and the even columns during either one of an odd field period or an even field period;

(c) only sampling the pixel elements in the intersections of the even rows and the odd columns and the pixel elements in the intersection of the odd rows and the even columns during the other of the odd field period and the even field period; and (d) utilizing a plurality of pixel data in a specific block sampled from the pixel elements during one of the odd field period and the even field period to interpolate a specific pixel in the specific block.

9. The image sampling method as claimed in claim 8, wherein each pixel element in the intersection of the ith row and the jth column is denoted as (i, j) and the step (b) further comprises:

sequentially sampling the pixel element in (2x−1, 2y−1) and the pixel element in (2x, 2y) during the odd field period, wherein the x variable is sequentially increased by one from one to an integer of (m/2), and the y variable is sequentially increased by one from one to an integer of (n/2) relative to each x variable, m presents the number of rows and n presents the number of columns.

10. The image sampling method as claimed in claim 8, wherein each pixel element in the intersection of the ith row and the jth column is denoted as (i, j) and the step (b) further comprises:

sequentially sampling the pixel element in (2x+1, 2y−1) and the pixel element in (2x, 2y) during the even field period, wherein the x variable is sequentially increased by one from one to an integer of (m/2), and the y variable is sequentially increased by one from one to an integer of (n/2) relative to each x variable, m presents the number of rows and n presents the number of columns.

11. The image sampling method as claimed in claim 8, wherein each pixel element in the intersection of the ith row and the jth column is denoted as (i, j) and the step (c) further comprises:

sequentially sampling the pixel element in (2x, 2y−1) and the pixel element in (2x+1, 2y) during the even field period, wherein the x variable is sequentially increased by one from one to an integer of (m/2), and the y variable is sequentially increased by one from one to an integer of (n/2) relative to each x variable, m presents the number of rows and n presents the number of columns.

12. The image sampling method as claimed in claim 8, wherein each pixel element in the intersection of the ith row and the jth column is denoted as (i, j) and the step (c) further comprises:

sequentially sampling the pixel element in (2x, 2y−1) and the pixel element in (2x−1, 2y) during the odd field period, wherein the x variable is sequentially increased by one from one to an integer of (m/2), and the y variable is sequentially increased by one from one to an integer of (n/2) relative to each x variable, m presents the number of rows and n presents the number of columns.

13. The image processing method as claimed in claim 8, wherein the image sensor conforms to a Bayer pattern and the primary colors of light are red, green and blue.

14. The image processing method as claimed in claim 13, wherein each pixel element in one of the columns sense green image information, every two neighboring pixel elements in one column neighboring to the one of the columns alternatively sense red image information and blue image information and every two neighboring pixel elements in the other column neighboring to the one of the columns alternatively sense blue image information and red image information.

15. The image processing method as claimed in claim 13, wherein the step (d) further comprises:

calculating an average of the pixel data with one of the primary colors of light as an interpolated color data of the specific pixel.

16. The image processing method as claimed in claim 8, wherein the specific block is a 3×5 pixel matrix.

17. The image processing method as claimed in claim 16, wherein the specific pixel is a central pixel of the specific block.

\* \* \* \* \*